(12) United States Patent
Hayes et al.

(10) Patent No.: US 11,911,874 B2
(45) Date of Patent: Feb. 27, 2024

(54) PORTABLE WET SAND BLASTER

(71) Applicants: Richard J. Hayes, Folsom, CA (US); Laura L. Machado, Folsom, CA (US)

(72) Inventors: Richard J. Hayes, Folsom, CA (US); Laura L. Machado, Folsom, CA (US)

(*) Notice: Subject to any disclaimer, the term of this patent is extended or adjusted under 35 U.S.C. 154(b) by 458 days.

(21) Appl. No.: 17/390,976

(22) Filed: Aug. 1, 2021

(65) Prior Publication Data
US 2023/0035722 A1    Feb. 2, 2023

(51) Int. Cl.
*B24C 5/02*     (2006.01)
*C09K 3/14*     (2006.01)

(52) U.S. Cl.
CPC ............. *B24C 5/02* (2013.01); *C09K 3/1463* (2013.01)

(58) Field of Classification Search
CPC .... B24C 3/02; B24C 3/04; B24C 5/02; B24C 5/04; B24C 7/0038; B24C 7/0046; B24C 7/0084; B24C 7/0076
USPC ........................................................... 451/90
See application file for complete search history.

(56) References Cited

U.S. PATENT DOCUMENTS

2019/0076988 A1*   3/2019   Paduano ............... B24C 7/0046

* cited by examiner

*Primary Examiner* — Eric J Rosen
*Assistant Examiner* — Tyler James McFarland
(74) *Attorney, Agent, or Firm* — Craig A. Simmermon

(57) ABSTRACT

A portable wet sand blasting device or a portable wet sand blaster with a specially designed and shaped hand truck tank with an inclined side, wheels, axle, base feet, and a handle to allow the heavy device to be more easily moved from job to job. The specially designed and shaped hand truck tank includes a special pump and special internal plumbing and mixing outputs that provide optimum water and abrasive slurry mixing wherein sufficient slurry mixing is required for the effective use of a wet sand blasting device.

4 Claims, 15 Drawing Sheets

PORTABLE WET SAND BLASTER

BACKGROUND OF THE INVENTION

1. Field of the Invention

This invention relates to a portable wet sand blasting device or a portable wet sand blaster. Specifically, this invention relates to a portable wet sand blaster with a specially designed and shaped hand truck tank with an inclined side, wheels, axle, base feet, and a handle to allow the heavy device to be more easily moved from job to job. In addition, this invention relates to a portable wet sand blaster with a specially designed and shaped hand truck tank with special internal plumbing and mixing outputs that provide optimum water and abrasive slurry mixing wherein sufficient slurry mixing is required for the effective use of a wet sand blaster and this device provides optimum slurry mixing for maximum efficiency and effectiveness of the wet sand blaster.

2. Description of Related Art

Abrasive blasting, more commonly known as sandblasting, is the operation of forcibly propelling a stream of abrasive material against a surface under high pressure to smooth a rough surface, roughen a smooth surface, shape a surface, or remove surface contaminants. A pressurized fluid, typically compressed air, is used to propel the blasting material or media. There are several variants of the process that use various media. Some media are highly abrasive, whereas others are milder. The most abrasive are shot blasting with metal shot and sandblasting with sand. Moderately abrasive variants include glass bead blasting with glass beads and plastic media blasting with ground-up plastic stock or walnut shells and corncobs. A mild version is soda blasting with baking soda. In addition, there are alternatives that are barely abrasive or nonabrasive, such as ice blasting and dry-ice blasting. Sandblasting equipment typically consists of a pressure vessel in which sand and air are mixed. The mixture travels through a hand-held nozzle to direct the particles toward the surface or workpiece. Another version of sand blasting is wet sand blasting. Wet sand blasting mixes water with the abrasive material so that the abrasive material is wet and not dry as with regular sand blasting. Wet abrasive blasting uses water as the primary fluid to move the abrasives instead of air as described above. The advantages of wet sand blasting are that the water traps the dust produced and lubricates the surface. The water cushions the impact on the surface and reduces the amount of removal of material. Thus, wet sand blasting is much more delicate than regular dry air sand blasting. Wet sandblasting equipment typically consists of a tank or chamber in which sand and water are mixed. The mixture travels through a hand-held nozzle to direct the particles toward the surface or workpiece. The wet sand blaster of this invention is portable and includes a special hand truck tank with an angled or inclined side and special internal plumbing to promote optimum slurry mixing. The special hand truck tank also includes wheels and a handle so that the whole device may be moved around like a hand truck. There are no other wet sand blasters in the prior art that are portable and include the specially designed and shaped slurry tank with the specially design internal plumbing as shown and describe below. Also, there are no other wet sand blasters in the prior art that are portable and include two wheels and an axle along with two base feet and a handle that allows the whole wet sand blaster device to be moved around and moved about like a hand truck. Sand blasting devices are typically very heavy and are extremely difficult to move. The special hand truck tank solves this problem by allowing the heavy device to be moved like a heavy hand truck with a heavy appliance attached thereto, wherein the "heavy appliance" is the heavy tank of slurry mix.

BRIEF SUMMARY OF THE INVENTION

It is an aspect of portable wet sand blaster to perform wet sand blasting operations or functions.

It is an aspect of portable wet sand blaster to be portable wherein one person may easily move the portable wet sand blaster around by hand and load and unload portable wet sand blaster into a truck or van by hand.

It is an aspect of portable wet sand blaster to include a basting gun with a venturi nozzle.

It is an aspect of portable wet sand blaster to connect with an air compressor.

It is an aspect of portable wet sand blaster to include a specially shaped tank with a trapezoidal shaped or right trapezoidal shaped cross section.

It is an aspect of the specially shaped tank to include two wheels, two feet, and a handle in order to allow the specially shaped tank to be moved and positioned like a hand truck.

It is an optional aspect of the specially shaped tank to include a stowable hose rack.

It is an aspect of portable wet sand blaster to include a slurry pump that rests in the bottom of the specially shaped tank.

It is an aspect of portable wet sand blaster to include a specially designed manifold that is connected to the slurry pump.

It is an aspect of the specially designed manifold to include a first slurry mixing output and a second slurry mixing output that are both positioned or angled to be parallel with the plane of the rear side of the specially shaped tank.

It is an aspect of the specially designed manifold to include a Y-branch outlet that feeds a slurry output line and basting gun with a venturi nozzle.

DEFINITION LIST

Figure 1:
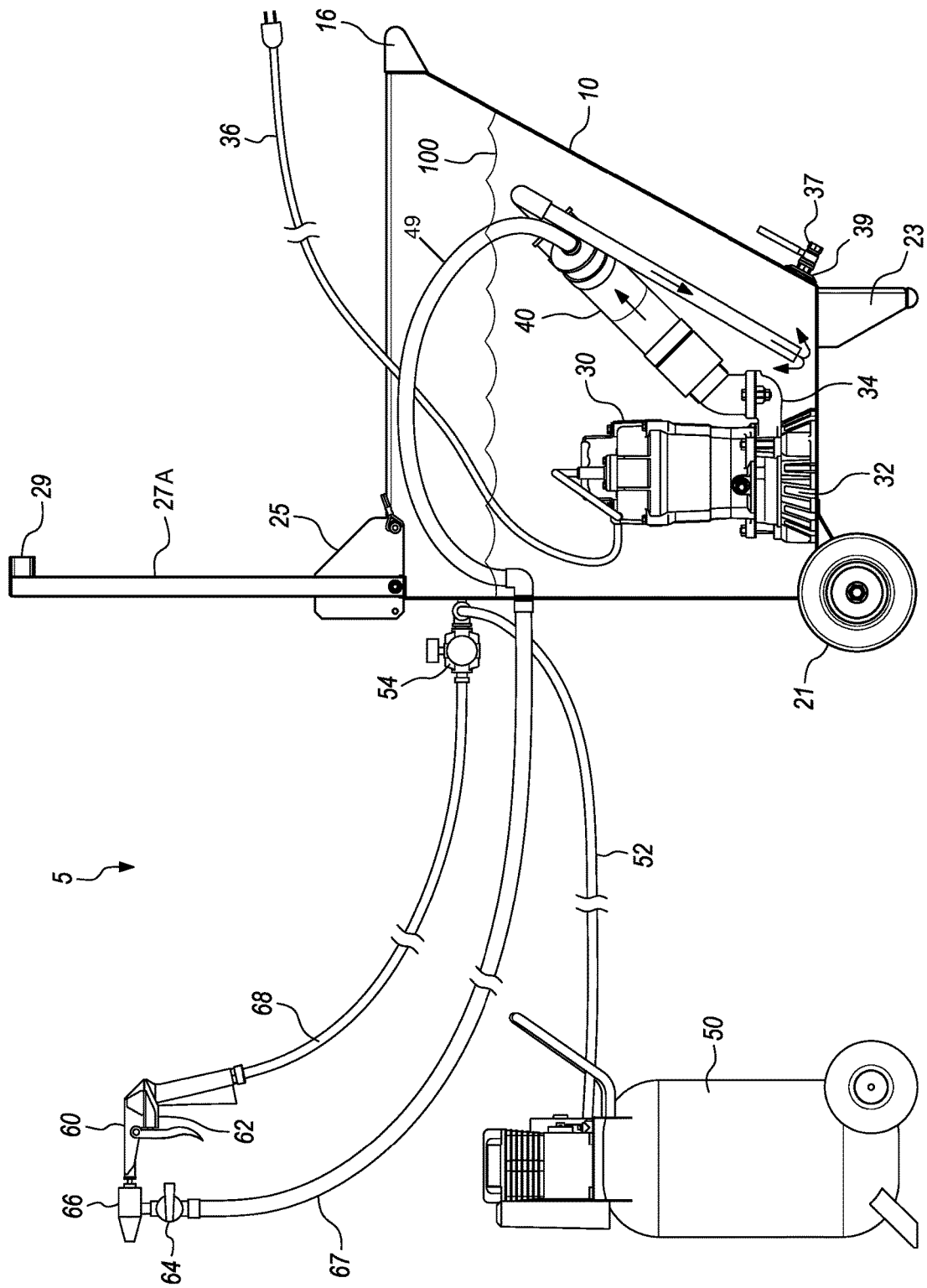
FIG. 1 is a cross sectional view of portable wet sand blaster.
Figure 2:
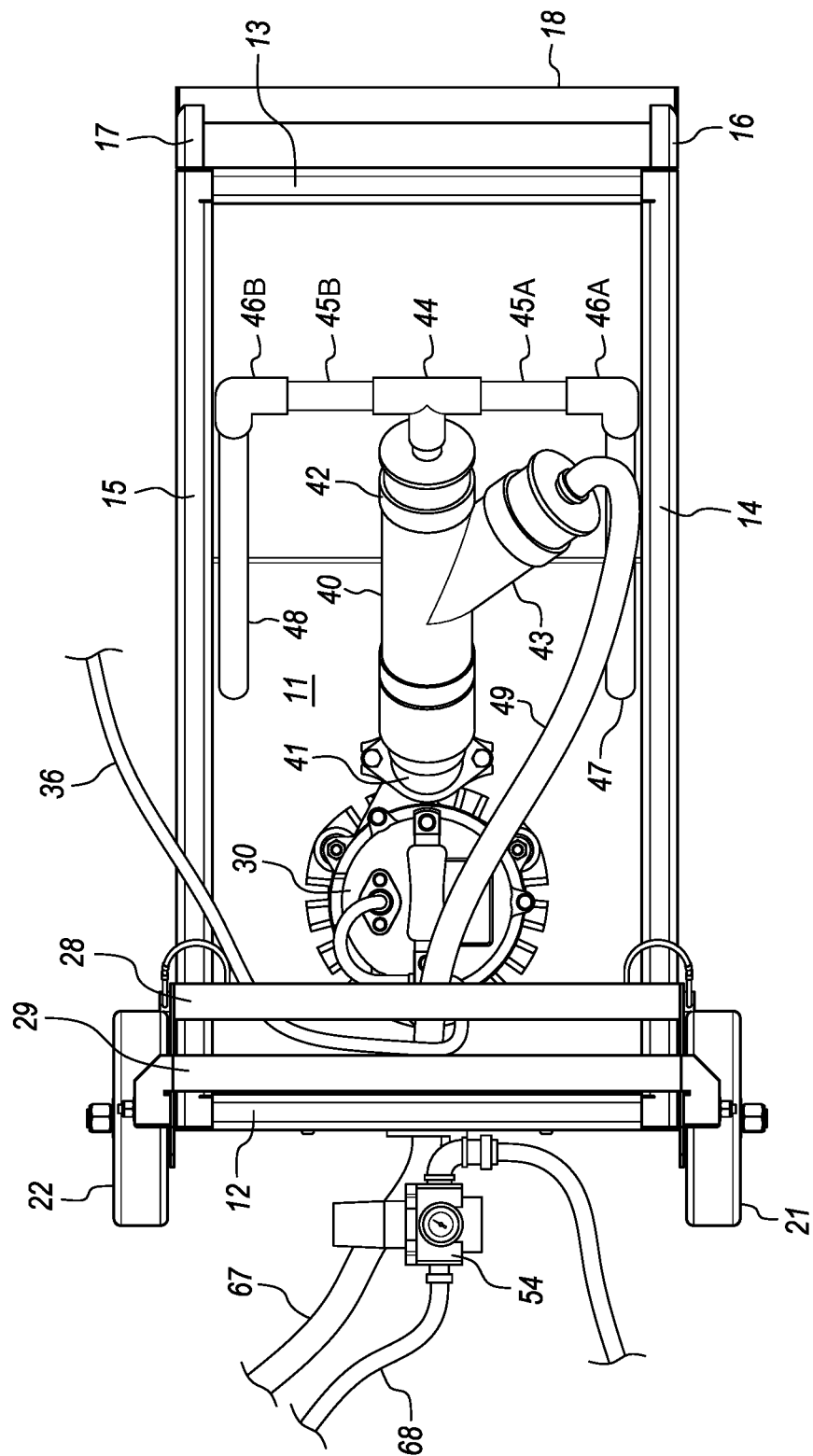
FIG. 2 is an enlarged top plan view of hand truck tank with components inside and attached thereto.

| Term | Definition |
| --- | --- |
| 5 | Portable Wet Sand Blaster |
| 10 | Hand Truck Tank |
| 11 | Bottom Panel of Hand Truck Tank |
| 12 | Front Side of Hand Truck Tank |
| 13 | Rear Side of Hand Truck Tank |
| 14 | Right Side of Hand Truck Tank |
| 15 | Left Side of Hand Truck Tank |
| 16 | First Handle Support on Hand Truck Tank |
| 17 | Second Handle Support on Hand Truck Tank |
| 18 | Handle on Hand Truck Tank |
| 19 | First Wheel Support on Hand Truck Tank |
| 20 | Second Wheel Support on Hand Truck Tank |
| 21 | First Wheel on Hand Truck Tank |
| 22 | Second Wheel on Hand Truck Tank |
| 23 | First Base Foot on Hand Truck Tank |
| 24 | Second Base Foot on Hand Truck Tank |
| 25 | First Stowable Hose Rack Mounting Bracket |
| 26 | Second Stowable Hose Rack Mounting Bracket |
| 27A | First Stanchion on Stowable Hose Rack |
| 27B | Second Stanchion on Stowable Hose Rack |
| 28 | First Cross Member on Stowable Hose Rack |
| 29 | Second Cross Member on Stowable Hose Rack |
| 30 | Slurry Pump |
| 32 | Intake Port or Opening on Slurry Pump |
| 34 | Output Port or Opening on Slurry Pump |
| 36 | Power Cord on Slurry Pump |
| 37 | Drain Valve on Hand Truck Tank |
| 38 | Slurry Feed Line Hole or Fitting in Front Side |
| 39 | Drain Hole in Rear Side of Hand Truck Tank |
| 40 | Manifold |
| 41 | Manifold Input |
| 42 | Main Output on Manifold |
| 43 | Y-Branch Output on Manifold |
| 44 | T-Fitting |
| 45A | First Length of Pipe or Conduit |
| 45B | Second Length of Pipe or Conduit |
| 46A | First Elbow Fitting |
| 46B | Second Elbow Fitting |
| 47 | First Slurry Mixing Output |
| 48 | Second Slurry Mixing Output |
| 49 | Slurry Output Line |
| 50 | Air Compressor |
| 52 | Air Compressor Output Hose |
| 54 | Pressure Regulator for Air Compressor |
| 60 | Blasting Gun |
| 62 | Air Valve |
| 64 | Slurry Valve |
| 66 | Nozzle |
| 67 | Slurry Feed Line |
| 68 | Compressed Air Feed Line |
| 100 | Slurry, Slurry Mix, or Slurry Contents |
| 110 | Workpiece with Unwanted Surface Coating |
| 120 | Workpiece Stripped of the Unwanted Surface Coating |

DETAILED DESCRIPTION OF THE INVENTION

Portable wet sand blaster 5 comprises: a hand truck tank 10; a slurry pump 30; a manifold 40; and a blasting gun 60.

Hand truck tank 10 is a tank that may be moved around like a hand truck. A hand truck is an L-shaped box or cart with handles at one end and wheels at the base. To be moved, a hand truck is tilted backward until the weight is balanced over the wheels, and then pushed forward, making otherwise bulky and heavy objects easier to move. In this case, the hand truck tank 10 is tilted by pulling a second cross member 29 on hand truck tank 10 in order to bring the weight of the hand truck tank 10 and its heavy contents over first and second wheels 21,22 in order to more easily move the heavy and bulking load of the hand truck tank 10 filled with slurry mix 100 or slurry 100. Slurry mix 100 or slurry 100 is a colloid or colloidal mix of water and abrasive solid material. When the hand truck tank 10 is positioned in the desired location, then the hand truck tank 10 is lowered back to the horizontal position so that it rests on first and second base feet 23,24 along with first and second wheels 21,22. This is similar to how a hand truck is moved and set back down again. Any known type of abrasive solid material may be used with portable wet sand blaster 5 such as: sand, aluminum oxide, silicon carbon, cob, nut shell particles, corundum, microbeads or any other known type of solid material.

Hand truck tank 10 comprises: a bottom panel 11; a front side 12; a rear side 13; a right side 14; and a left side 15. Bottom panel 11 is a rigid rectangular horizontal planar member with a front edge, a rear edge, a left edge, a right edge, an inner surface, and an outer surface. Bottom panel 11 is about 0.5-3 feet wide and 0.5-5 feet long. Front side 12 is a rigid rectangular vertical planar member with an upper edge, a lower edge, a left edge, a right edge, an inner surface, and an outer surface. Front side 12 is about 0.5-3 feet wide and 0.5-5 feet long. Front side 12 has a slurry feed line hole or fitting therein which is a circular hole, fitting, connector, or flange in the front side 12 that is used to pass a slurry feed line 67 therethrough as discussed below. Rear side 13 is a rigid rectangular planar angled member with an upper edge, a lower edge, a left edge, a right edge, an inner surface, and an outer surface. Rear side 13 is about 0.5-3 feet wide and 0.5-6 feet long. The widths of bottom panel 11, front side 12, and rear side 13 are equivalent. Rear side 13 has a drain hole 39 therein which is a circular hole through the rear side 13 that is used to attach a drain valve 37 thereto as discussed below. Right side 14 is a rigid right trapezoid vertical planar member with an upper edge, a lower edge, a front edge, a rear edge, an inner surface, and an outer surface. The upper and lower edges of right side 14 are parallel with each other and perpendicular to the front edge of right side 14 as depicted. Right side 14 is about 0.5-6 feet in overall width and about 0.5-6 feet in overall length. Left side 15 is a rigid right trapezoid vertical planar member with an upper edge, a lower edge, a front edge, a rear edge, an inner surface, and an outer surface. The upper and lower edges of left side 15 are parallel with each other and perpendicular to the front edge of left side 15 as depicted. Left side 15 is about 0.5-6 feet in overall width and about 0.5-6 feet in overall length. There is no upper side of hand truck tank 10 because the hand truck tank 10 is open at the top as depicted. Bottom panel 11, front side 12, rear side 13, right side 14, and left side 15 may be made of any known material such as metal, steel, wood, plastic, composite, fiberglass, or any other known material. In best mode, bottom panel 11, front side 12, rear side 13, right side 14, and left side 15 are made of sheet metal.

The lower edge of front side 12 is connected to and contiguous with the front edge of bottom panel 11 to form a rigid watertight connection therebetween. The plane of front side 12 is positioned or located perpendicular to the bottom panel 11 as depicted. The right edge of front side 12 is connected to and contiguous with the front edge of right side 14 to form a rigid watertight connection therebetween. The plane of front side 12 is positioned or located perpendicular to the right side 14 as depicted. The left edge of front side 12 is connected to and contiguous with the front edge of left side 15 to form a rigid watertight connection therebetween. The plane of front side 12 is positioned or located perpendicular to the left side 15 as depicted. The lower edge of right side 14 is connected to and contiguous with the right edge of bottom panel 11 to form a rigid watertight connection therebetween. The rear edge of the right side 14 is connected to and contiguous with the left edge of rear side 13 to form a rigid watertight connection therebetween. The lower edge of left side 15 is connected to and contiguous with the left edge of bottom panel 11 to form a rigid watertight connection therebetween. The rear edge of the left side 15 is connected to and contiguous with the right edge of rear side 13 to form a rigid watertight connection therebetween. The lower edge of the rear side 13 is connected to and contiguous with the rear edge of bottom panel 11 to form a rigid watertight connection therebetween. The plane of rear side 13 is positioned or located at an obtuse angle with the bottom panel 11 as depicted. The plane of rear side 13 is positioned or located at a right angle with the right and left sides 14,15 as depicted. The upper edges of front side 12, right side 14, left side 15, and rear side 13 are horizontal and aligned with each other to form a flat top or opening of hand truck tank as depicted. The rigid watertight connections between these members may be accomplished by any known means such as: weld, epoxy, glue, adhesive, fasteners, bolts, screws, nails, brazing, seam seal, rolled seam, press fit, or any other know means. In best mode, the rigid watertight connections between these members are accomplished by welding. Hand truck tank 10 has a special cross sectional shape that is a rigid right trapezoid according to the shape of right side 14 and left side 15 of hand truck tank 10. This specially shaped hand truck tank 10, combined with the special design of the manifold 40, as discussed below, causes a maximum amount of suspension of the abrasive solid material in the slurry mix 100 being stored in the hand truck tank 10.

Hand truck tank 10 may further comprise: a first handle support 16; a second handle support 17; and a handle 18. Handle 18 is a rigid oblong member with a first end, a middle section, and a second end. The length of handle 18 is equivalent to the widths of bottom panel 11, front side 12, and rear side 13. Handle 18 functions as a support member for the user to grab onto and hold in order to lift and rotate the hand truck tank 10 so that the first and second base feet 23,24 are raised off of the ground or surface and to position the weight of the hand truck tank 10 and its slurry contents 100 over the first and second wheels 21,22 and then push or move the hand truck tank and its slurry contents 100 to a desired location. In this way, the hand truck tank 10 and its slurry contents 100 are moved like a hand truck with a load or heavy appliance thereon. Handle 18 may be made of any known material such as metal, steel, wood, plastic, composite, fiberglass, or any other known material. In best mode, handle 18 is made of tubular metal or tubular steel. First handle support 16 is a rigid base member or support member that is rigidly attached to the outer surface of rear side 13 on the upper edge of rear side, at the end that is adjacent to right side 14 as depicted. First handle support 16 protrudes outward from the outer surface of rear side 13 as depicted. The first end of handle 18 is rigidly attached to first handle support 16. First handle support 16 functions to hold and support the first end of handle 18. First handle support 16 locates or positions the handle 18 at a distance of about 0.5-6 inches from the outer surface of rear side 13 to allow the user to reach his hand around the handle 18 and in between handle 18 and the outer surface of rear side 13. Rigid attachment may be accomplished by any known means such as: weld, epoxy, glue, adhesive, fasteners, bolts, screws, nails, brazing, seam seal, rolled seam, press fit, or any other know means. In best mode, rigid attachment is accomplished by welding. Second handle support 17 is a rigid base member or support member that is rigidly attached to the outer surface of rear side 13 on the upper edge of rear side, at the end that is adjacent to left side 15 as depicted. Second handle support 17 protrudes outward from the outer surface of rear side 13 as depicted. The second end of handle 18 is rigidly attached to second handle support 17. Second handle support 17 functions to hold and support the second end of handle 18. Second handle support 17 locates or positions the handle 18 at a distance of about 0.5-6 inches from the outer surface of rear side 13 to allow the user to reach his hand around the handle 18 and in between handle 18 and the outer surface of rear side 13. Rigid attachment may be accomplished by any known means such as: weld, epoxy, glue, adhesive, fasteners, bolts, screws, nails, brazing, seam seal, rolled seam, press fit, or any other know means. In best mode, rigid attachment is accomplished by welding.

Hand truck tank 10 may further comprise: a first wheel support 19; a second wheel support 20; a first wheel 21; and a second wheel 22. First wheel 21 is a wheel or a rigid disk shaped member with a center hole and a circumference. An axle is pivotally attached to the center hole of first wheel 21. First wheel functions in tandem with second wheel 22 in order to support the weight of hand truck tank 10 and its slurry contents 100 to allow the weight of the hand truck tank 10 and its slurry contents 100 to be more easily moved by rolling it on first and second wheels 21,22. Second wheel 22 is a wheel or a rigid disk shaped member with a center hole and a circumference. An axle is pivotally attached to the center hole of second wheel 22. Second wheel functions in tandem with first wheel 21 in order to support the weight of hand truck tank 10 and its slurry contents 100 to allow the weight of the hand truck tank 10 and its slurry contents 100 to be more easily moved by rolling it on first and second wheels 21,22. First wheel support 19 is a rigid base member or support member that is rigidly attached to the outer surface of bottom panel 11 at the corner of bottom panel 11 that is adjacent to the front side 12 and right side 14 as depicted. First wheel support 19 protrudes outward from the outer surface of bottom panel 11 as depicted. An axle is rigidly attached to first wheel support 19 with the axle's longitudinal axis parallel with the plane of bottom panel 11. First wheel support 19 functions to hold and support the axle. Second wheel support 20 is a rigid base member or support member that is rigidly attached to the outer surface of bottom panel 11 at the corner of bottom panel 11 that is adjacent to the front side 12 and left side 15 as depicted. Second wheel support 20 protrudes outward from the outer surface of bottom panel 11 as depicted. An axle is rigidly attached to second wheel support 20 with the axle's longitudinal axis parallel with the plane of bottom panel 11. Second wheel support 20 functions to hold and support the axle. Note that alternately axle could be pivotally attached to both first and second wheel supports 19,20 and both wheels 21,22 could be rigidly attached to the axle.

Hand truck tank 10 may further comprise: a first base foot 23 and a second base foot 24. First foot base 23 is a rigid base member or support member that is rigidly attached to the outer surface of bottom panel 11 at the corner of bottom panel 11 that is adjacent to the rear side 13 and right side 14 as depicted.

First foot base 23 protrudes outward from the outer surface of bottom panel 11 as depicted. First foot base 23 functions pedestal, base, or foot support for the hand truck tank 10 and its slurry contents 100 when the hand truck tank 10 is flat and at rest wherein the first foot base 23 then rests on the ground or surface. When the hand truck tank 10 is tilted in order to move the hand truck tank 10, first foot base 23 and second base foot 24 are lifted off of the ground and all the weight of the hand truck tank 10 and its slurry contents 100 is positioned onto first and second wheels 21,22. Second foot base 24 is a rigid base member or support member that is rigidly attached to the outer surface of bottom panel 11 at the corner of bottom panel 11 that is adjacent to the rear side 13 and left side 15 as depicted. Second foot base 24 protrudes outward from the outer surface of bottom panel 11 as depicted. Second foot base 24 functions pedestal, base, or foot support for the hand truck tank 10 and its slurry contents 100 when the hand truck tank 10 is flat and at rest wherein the second foot base 24 then rests on the ground or surface. When the hand truck tank 10 is tilted in order to move the hand truck tank 10, first foot base 23 and second base foot 24 are lifted off of the ground and all the weight of the hand truck tank 10 and its slurry contents 100 is positioned onto first and second wheels 21,22.

Hand truck tank 10 may further comprise a stowable hose rack assembly that is used to store and hold a slurry feed line 67 and a compressed air feed line 68 as described below. Stowable hose rack assembly is stowable, meaning the stowable hose rack assembly can rotate upwards, as depicted in FIGS. 4-9, for easy access to the slurry feed line 67 and the compressed air feed line 68 wherein the slurry feed line 67 and the compressed air feed line 68 may be easily wound and stored onto the stowable hose rack assembly and the stowable hose rack assembly can be rotated downwards or stowed, as depicted in FIGS. 10-15, when the portable wet sand blaster 5 is not in use in order to make the portable wet sand blaster 5 more easily moved and transported in the back of a pickup truck or van.

Stowable hose rack assembly comprises: a first stowable hose rack mounting bracket 25; a second stowable hose rack mounting bracket 26; a first stanchion 27A; a second stanchion 27B; a first cross member 28; and a second cross member 29. First stowable hose rack mounting bracket 25 is a rigid planar member with an upper edge, a lower edge, a front edge, a rear edge, a right surface, and a left surface, a pivot pin hole, and a lock pin hole. Second stowable hose rack mounting bracket 26 is a rigid planar member with an upper edge, a lower edge, a front edge, a rear edge, a right surface, and a left surface, a pivot pin hole, and a lock pin hole. First stanchion 27A is a rigid oblong member with a first end, a second end, a front surface, a rear surface, a right surface, a left surface, and a longitudinal axis. First stanchion 27A has a length of about 0.5-5 feet. Second stanchion 27B is a rigid oblong member with a first end, a second end, a front surface, a rear surface, a right surface, a left surface, and a longitudinal axis. Second stanchion 27*b* has a length of about 0.5-5 feet. First cross member 28 is a rigid oblong member with a right end, a left end, a front surface, a rear surface, a top surface, a bottom surface, and a longitudinal axis. First cross member 28 has a length of about 0.5-3 feet and is sized to be slightly longer than the width of hand truck tank 10. Second cross member 29 is a rigid oblong member with a right end, a left end, a front surface, a rear surface, a top surface, a bottom surface, and a longitudinal axis. Second cross member 29 has a length of about 0.5-3 feet and is sized to be slightly longer than the width of hand truck tank 10.

The first end of the left surface of first stanchion 27A is rigidly attached to the right surface of first stowable hose rack mounting bracket 25 so that the lower edge of first stowable hose rack mounting bracket 25 is aligned with and flush with the first end of first stanchion 27A and with the longitudinal axis of first stanchion 27A parallel with the plane of first stowable hose rack mounting bracket 25 as depicted. The first end of the right surface of second stanchion 27B is rigidly attached to the left surface of second stowable hose rack mounting bracket 26 so that the lower edge of second stowable hose rack mounting bracket 26 is aligned with and flush with the first end of second stanchion 27B and with the longitudinal axis of second stanchion 27B parallel with the plane of second stowable hose rack mounting bracket 26 as depicted. The right end of first cross member 28 is rigidly attached to the left surface of first stowable hose rack mounting bracket 25 at the front edge of first stowable hose rack mounting bracket 25 so that the longitudinal axis of first cross member 28 is perpendicular to the plane of first stowable hose rack mounting bracket 25 as depicted. The left end of first cross member 28 is rigidly attached to the right surface of second stowable hose rack mounting bracket 26 at the front edge of second stowable hose rack mounting bracket 26 so that the longitudinal axis of first cross member 28 is perpendicular to the plane of second stowable hose rack mounting bracket 26 as depicted. The right end of second cross member 29 is rigidly attached to the front surface of first stanchion 27A at the upper edge of first stanchion 27A so that the longitudinal axis of second cross member 29 is perpendicular to the longitudinal axis of first stanchion 27A as depicted. The left end of second cross member 29 is rigidly attached to the front surface of second stanchion 27B at the upper edge of second stanchion 27B so that the longitudinal axis of second cross member 29 is perpendicular to the longitudinal axis of second stanchion 27B as depicted. In this arrangement, first and second stanchions 27A, 27B are aligned and parallel as depicted and first and second cross members 28, 29 are aligned and parallel as depicted, wherein first and second stanchions 27A, 27B are perpendicular to first and second cross members 28, 29 as depicted. Stowable hose rack assembly may be made of any known material such as metal, steel, wood, plastic, composite, fiberglass, or any other known material. In best mode, stowable hose rack assembly is made of tubular metal or tubular steel.

Stowable hose rack assembly forms a rigid lattice structure that resembles a two rung ladder, as depicted, which is pivotally attached to hand truck tank 10 as follows. The inside surface of first stowable hose rack mounting bracket 25 is pivotally attached to the outer surface of the right side 14 of hand truck tank 10 at the corner of the right side 14 that is adjacent to the upper edge and the front edge of right side 14 as depicted. Pivotal attachment is accomplished by inserting a first pin or fastener through a hole in first stanchion 27A, a hole in first stowable hose rack mounting bracket 25, and a hole in right side 14 of hand truck tank 10 to create pivotal attachment between the rigid lattice structure and the right side 14 of hand truck tank 10. The inside surface of second stowable hose rack mounting bracket 26 is pivotally attached to the outer surface of the left side 15 of hand truck tank 10 at the corner of the left side 15 that is adjacent to the upper edge and the front edge of left side 15 as depicted. Pivotal attachment is accomplished by inserting a second pin or fastener through a hole in second stanchion 27B, a hole in second stowable hose rack mounting bracket 26, and a hole in left side 15 of hand truck tank 10 to create pivotal attachment between the rigid lattice structure and the left side 15 of hand truck tank 10. This pivotal attachment allows the rigid lattice structure to be rotated upwards as depicted in FIGS. 4-9 and rotated downwards as depicted in FIGS. 10-15. The stowed position is the rotated downward position as depicted in FIGS. 10-15. In order to hold or lock stowable hose rack assembly in the upright position, a third pin or fastener is inserted through a second hole in first stowable hose rack mounting bracket 25 and a second hole in the right side 14 of hand truck tank and a fourth pin or fastener is inserted through a second hole in second stowable hose rack mounting bracket 26 and a second hole in the left side 15 of hand truck tank in order to lock stowable hose rack assembly in this position and to prevent it from rotating back downward to the stowed position as depicted in FIGS. 10-15.

Slurry pump 30 is a pump or a device that moves fluids or slurries by mechanical action. Slurry pump 30 is a submersible pump or sub pump which has a sealed motor coupled to the pump body where the whole assembly is submerged in the fluid to be pumped. The main advantage of this type of pump is that it prevents pump cavitation which is a problem associated with an elevational difference between the pump and the fluid/slurry surface. Submersible pumps push fluid up from their submersed location. Typically, submersible pumps are powered by an electric motor. Slurry pump 30 functions to keep abrasive solid material suspended within the slurry 100, as described below, and to pressurize a blasting gun 60 in order to spray, eject, or squirt the slurry 100 at a workpiece 110, as described below. Any known type of submersible pump may be used. In best mode a slurry pump 30 is an electric submersible pump. Thus, slurry pump 30 may further comprise: a power cord 36 that is used to supply electrical current to power the electric submersible pump.

Slurry pump 30 has an intake port or opening 32 and an output port or opening 34. Intake port or opening 32 is an opening, port, or inlet on the bottom of slurry pump 30 as depicted. Intake port or opening 32 is the opening through which the mechanical pump action of slurry pump 30 pulls in or draws in the slurry 100 into the mechanical pump action in order to pump the slurry 100. Output port or opening 34 is an opening, port, or outlet on the back or side of slurry pump 30 as depicted. Outlet port or opening 34 is the opening through which the mechanical pump action of slurry pump 30 pushes out or pumps out the slurry 100 from the slurry pump 30. Output port or opening 34 may have a fitting, connector, flange, or other interface that that is reversibly attachable to another fitting, connector, flange, or other interface on the manifold input 41 as discussed below. Every pump has an intake port of opening 32 and an output port or opening 34.

Manifold 40 is a special configuration of cylindrical conduit, flow channel, pipe, hose, tubing, or duct that causes the slurry mix 100 in the hand truck tank 10 to reach maximum suspension wherein the abrasive solid material in the water is forced to circulate, swirl, or convect within the water at the maximum amount possible in order to cause the maximum amount of abrasive solid material to be suspended in the water above the bottom of the hand truck tank 10. As stated above, the slurry mix 100 or slurry 100 is sprayed, ejected, or projected onto the surface of a workpiece 110 at high pressure in order to effectuate the wet sand blasting process wherein the suspended abrasive solid material in the slurry 100 strips an unwanted surface coating from a workpiece 110 but does not disturb the natural surface of the workpiece 110. Without the slurry pump 30 and the manifold 40 to cause the circulation, swirling, or convection, of the abrasive solid material in the water, the abrasive solid material would simply fall to the bottom of the hand truck tank 10 in a few seconds. The abrasive solid material must be suspended in the water in order to create the slurry 100. Without this suspension, it is not considered slurry 100. During the wet sand blasting process, there must be continuous circulation, swirling, or convection, of the abrasive solid material in the water in order to create the colloidal suspension or the slurry 100 itself. The manifold of this invention is special because this specially designed manifold 40, combined with the special shape of the hand truck tank 10, causes a maximum amount of suspension of the abrasive solid material in the slurry mix 100 being stored in the hand truck tank 10.

Manifold 40 comprises: a manifold input 41; a main manifold output 42; a Y-branch output 43; a T-fitting 44; a first length of pipe or conduit 45A; a second length of pipe or conduit 45B; a first elbow fitting 46A; a second elbow fitting 46B; a first slurry mixing output 47; a second slurry mixing output 48; and a slurry output line 49.

Manifold input 41 is a length of cylindrical conduit, flow channel, pipe, hose, tubing, or duct with a first end, a second end, a longitudinal axis, an inner diameter, and an outer diameter. The inner diameter of manifold input 41 is about 1-10 inches. There is a fitting, connector, flange, or other interface rigidly attached to the first end of manifold input 41 to make a watertight connection therebetween. This fitting, connector, flange, or other interface is reversibly attachable to the output port or opening 34 on slurry pump 30 to make a watertight connection therebetween.

Main manifold output 42 is a length of cylindrical conduit, flow channel, pipe, hose, tubing, or duct with a first end, a second end, a longitudinal axis, an inner diameter, and an outer diameter. The inner diameter of manifold input 41 is about 1-10 inches. The first end of main manifold output 42 is rigidly attached to the second end of manifold input 41 to make a watertight connection therebetween. This connection point is defined as the middle section of manifold 40. The longitudinal axis of manifold input 41 is parallel with that of main manifold output 42.

Y-branch output 43 is a is a length of cylindrical conduit, flow channel, pipe, hose, tubing, or duct with a first end, a second end, a longitudinal axis, an inner diameter, and an outer diameter. The inner diameter of manifold input 41 is about 1-10 inches. The first end of Y-branch output 43 is rigidly attached to the middle section of manifold 40, which is the section of manifold 40 in between manifold input 41 and main manifold output 42 to make a watertight connection therebetween. The second end of Y-branch output 43 has a reducer fitting or bushing fitting or similar that is used to properly connect or attach the first end of slurry output line 49 to Y-branch output 43, as discussed below. The diameter of the slurry output line 49 is smaller than the diameter of the Y-branch output 43 and a fitting is needed to step down the diameter. The longitudinal axis of Y-branch output 43 is at an acute angle to that of main manifold output 42. The longitudinal axis of Y-branch output 43 is at an obtuse angle to that of manifold input 41. These members form a Y-shape wherein the main manifold output 42 and the Y-branch output 43 make the top legs of the Y-shape and the manifold input 41 makes up the base portion of the Y-shape.

The inner diameters of manifold input 41, main manifold output 42, and Y-branch output 43 are essentially equivalent to each other.

T-fitting 44 is a T-shaped fitting or section of cylindrical conduit, flow channel, pipe, hose, tubing, or duct with a base end, a first end, a second end, an inner diameter, and an outer diameter. The base end is the bottom end or base end of the T-shape. The first and second ends are the upper ends of the T-shape. Thus, there is a ninety-degree bend between the base end and the first end and there is a ninety-degree bend between the base end and the second end. There is a one hundred eighty degree bend between the first end and the second end. The inner diameter of T-fitting 44 is about 0.25-5 inches. The inner diameter of T-fitting 44 is less than that of main manifold output 42.

First length of pipe or conduit 45A is a horizontal length of cylindrical conduit, flow channel, pipe, hose, tubing, or duct with a first end and a second end with a first end, a second end, a length, an inner diameter, and an outer diameter. The outer diameter of first length of pipe or conduit 45A is about 0.25-5 inches. The outer diameter of first length of pipe or conduit 45A is essentially equivalent to the inner diameter of T-fitting 44. The length of first length of pipe or conduit 45A is about 1-8 inches.

Second length of pipe or conduit 45B is a horizontal length of cylindrical conduit, flow channel, pipe, hose, tubing, or duct with a first end and a second end with a first end, a second end, a length, an inner diameter, and an outer diameter. The outer diameter of second length of pipe or conduit 45B is about 0.25-5 inches. The outer diameter of second length of pipe or conduit 45B is essentially equivalent to the inner diameter of T-fitting 44. The length of second length of pipe or conduit 45B is about 1-8 inches.

First elbow fitting 46A is a L-shaped fitting or section of cylindrical conduit, flow channel, pipe, hose, tubing, or duct with a base end, a first end, a second end, an inner diameter, and an outer diameter. There is a ninety degree bend between the first end and the second end of first elbow fitting 46A. The inner diameter of first elbow fitting 46A is about 0.25-5 inches. The inner diameter of first elbow fitting 46A is essentially equivalent to that of T-fitting 44.

Second elbow fitting 46B is a L-shaped fitting or section of cylindrical conduit, flow channel, pipe, hose, tubing, or duct with a base end, a first end, a second end, an inner diameter, and an outer diameter. There is a ninety degree bend between the first end and the second end of second elbow fitting 46B. The inner diameter of second elbow fitting 46B is about 0.25-5 inches. The inner diameter of second elbow fitting 46B is essentially equivalent to that of T-fitting 44.

First slurry mixing output 47 is a length of cylindrical conduit, flow channel, pipe, hose, tubing, or duct with a first end, a second end, a length, a longitudinal axis, an inner diameter, and an outer diameter. The outer diameter of first slurry mixing output 47 is about 0.25-5 inches. The outer diameter of first slurry mixing output 47 is essentially equivalent to the inner diameter of T-fitting 44. The length of first slurry mixing output 47 is about 3-18 inches. The longitudinal axis of first slurry mixing output 47 is essentially parallel with the plane of the rear side 13 of hand truck tank 10. The angle and direction of first slurry mixing output 47 is important because this angle and direction helps create the maximum slurry suspension detailed above.

Second slurry mixing output 48 is a length of cylindrical conduit, flow channel, pipe, hose, tubing, or duct with a first end, a second end, a length, a longitudinal axis, an inner diameter, and an outer diameter. The outer diameter of second slurry mixing output 48 is about 0.25-5 inches. The outer diameter of second slurry mixing output 48 is essentially equivalent to the inner diameter of T-fitting 44. The length of second slurry mixing output 48 is about 3-18 inches. The longitudinal axis of second slurry mixing output 48 is essentially parallel with the plane of the rear side 13 of hand truck tank 10. The angle and direction of second slurry mixing output 48 is important because this angle and direction helps create the maximum slurry suspension detailed above.

Slurry output line 49 is a length of cylindrical conduit, flow channel, pipe, hose, tubing, or duct with a first end, a second end, a length, an inner diameter, and an outer diameter. The outer diameter of slurry output line 49 is about 0.25-5 inches. The length of slurry output line 49 is about 1-8 feet.

The base end of T-fitting 44 is rigidly attached to main manifold output 42 to make a watertight connection therebetween. The first end of T-fitting 44 is rigidly attached to the first end of the first length of pipe or conduit 45A. The second end of T-fitting 44 is rigidly attached to the first end of the second length of pipe or conduit 45B. The second end of the first length of pipe or conduit 45A is rigidly attached to the first end of first elbow fitting 46A. The second end of the second length of pipe or conduit 45B is rigidly attached to the first end of second elbow fitting 46B. The second end of first elbow fitting 46A is rigidly attached to the first end of first slurry mixing output 47. The second end of second elbow fitting 46B is rigidly attached to the first end of second slurry mixing output 48. The second end of first slurry mixing output 47 is open to allow for the free flow of slurry mix 100 to flow or eject therefrom as a result of the pumping action of slurry pump 30. The second end of second slurry mixing output 48 is open to allow for the free flow of slurry mix 100 to flow or eject therefrom as a result of the pumping action of slurry pump 30. The first end of slurry output line 49 is rigidly attached to the second end of Y-branch output 43 to make a watertight connection therebetween. The second end of slurry output line 49 is rigidly attached to the slurry feed line hole or fitting 38 in front side 12 of hand truck tank 10.

The attachment or connection of the above components forms the manifold 40. The manifold 40 is specially designed and shaped as depicted. As stated, the longitudinal axes of the first and second slurry mixing output 47,48 are essentially parallel with the plane of the rear side 13 of hand truck tank 10 as depicted. The seconds ends of first and second slurry mixing output 47,48 are positioned in between the slurry pump 30 and the rear side 13 of hand truck tank 10 as depicted. The seconds ends of first and second slurry mixing output 47,48 are positioned close to the bottom panel 11 of hand truck tank 10 at about 1-10 inches above the inner surface of bottom panel 11 as depicted. The design and arrangement first and second slurry mixing output 47,48 is important because this helps create the maximum slurry suspension detailed above.

Portable wet sand blaster 5 may further comprise: an air compressor 50. Air compressor 50 is an air compressor or a pneumatic device that converts power from an electric motor, diesel or gasoline engine into potential energy stored in pressurized air or compressed air. An air compressor 50 forces or pumps air into a storage tank, thereby increasing the air pressure in the storage tank. The storage tank is a component of air compressor 50. When the air in the storage tank reaches a certain pressure, the air compressor shuts off and the compressed air is held in the storage tank until used. An air compressor 50 is required in order to properly use portable wet sand blaster 5; however, an air compressor is not included with the sale of a new portable wet sand blaster 5. Very typically, all users already have an air compressor 50 or otherwise use an existing air compressor 50 to connect with portable wet sand blaster 5 in order to use a portable wet sand blaster 5. Any known type of air compressor 50 may be used with portable wet sand blaster 5.

Air compressor 50 is connected to blasting gun 60 with an air compressor output hose 52 and a pressure regulator 54. Air compressor output hose 52 is a length of cylindrical conduit, flow channel, pipe, hose, tubing, or duct with a first end, a second end, a length, an inner diameter, and an outer diameter. The outer diameter of air compressor output hose 52 is about 0.25-5 inches. The length of air compressor output hose 52 can be 10 feet and up. Pressure regulator 54 is a special valve that controls the pressure of air or gas to a desired value. Pressure regulator 54 is a restrictor that limits the effluent air flow to a desired pressure setting. Pressure regulator 54 has a control dial or control mechanism that is used to adjust this pressure or set the pressure to a desired setting. Pressure regulator 54 has an input connector and an output connector. There are many types of pressure regulators 52 in the prior art. Any known type of pressure regulator 54 may be used with portable wet sand blaster 5. The first end of air compressor output hose 52 is connected to air compressor 50. The second end of air compressor output hose 52 is connected to the input connector of pressure regulator 54. The first end of compressed air feed line 68 is connected to the output connector of pressure regulator 54. The second end of compressed air feed line 68 is connected to blasting gun 60 as described below.

Blasting gun 60 is a is an apparatus that sprays, ejects, or squirts compressed air and slurry mix 100 onto the surface of a workpiece 110. Blasting gun 60 comprises: a first end, a second end, an air valve, a slurry valve; a nozzle; a slurry feed line; and a compressed air feed line. Blasting gun 60 has a high pressure tube or flow channel running through the blasting gun 60. High pressure tube or flow channel has a first end and a second end. The first end is on the bottom of the blasting gun 60. The second end is on the top of blasting gun 60, exiting out from the barrel of the blasting gun 60. Compressed air or high pressure air flows in the first end, through the high pressure tube or flow channel, and out of the second end. The compressed air is being pumped or compresses by an air compressor 50.

Air valve 62 is a valve on blasting gun 60 that controls, adjusts, and shuts off the air flow through the high pressure tube or flow channel of the blasting gun 60. Air valve 62 functions like a trigger valve or a trigger to start and stop shooting compressed air and slurry mix 100 onto the surface of a workpiece 110. The second end of high pressure tube or flow channel is downstream from air valve 62 as depicted.

Slurry valve 64 is a valve on nozzle 66 that controls, adjusts, and shuts off the flow of slurry mix 100 through the secondary input of nozzle 66. Slurry valve 64 functions to control or adjust the proportion of slurry mix 100 in the effluent flow of compressed air and slurry mix 100 being sprayed, ejected, or squirted onto the surface of a workpiece 110. Slurry valve 64 has a first end and a second end.

Nozzle 66 is a venturi tube with a main input, a constricted area, a secondary input, and a main output. Nozzle 66 works like any other venturi tube of venturi pump. The main input on nozzle 66 is connected to the second end of high pressure tube or flow channel or barrel of blasting gun 60.

Blasting gun 60 is connected to and fed by a compressed air feed line 68 and a slurry feed line 67. Compressed air feed line 68 is a length of cylindrical conduit, flow channel, pipe, hose, tubing, or duct with a first end, a second end, a length, an inner diameter, and an outer diameter. The outer diameter of compressed air feed line 68 is about 0.25-5 inches. The length of compressed air feed line 68 can be 20 feet and up. Slurry feed line 67 is a length of cylindrical conduit, flow channel, pipe, hose, tubing, or duct with a first end, a second end, a length, an inner diameter, and an outer diameter. The outer diameter of slurry feed line 67 is about 0.25-5 inches. The length of slurry feed line 67 can be 20 feet and up.

The main input on nozzle 66 is rigidly attached to the second end of high pressure tube or flow channel or barrel of blasting gun 60. The second end of slurry valve 66 is attached to the secondary input on nozzle 66. The first end of slurry valve 64 is connected to the second end of slurry feed line 67. The first end of slurry feed line 67 is connected to the slurry feed line hole or fitting 38 in front side 12 of hand truck tank 10. The first end of compressed air feed line 68 is connected to the output connector of pressure regulator 54. The second end of compressed air feed line 68 is connected to the first end of high pressure tube or flow channel of blasting gun 60.

Figure 3:
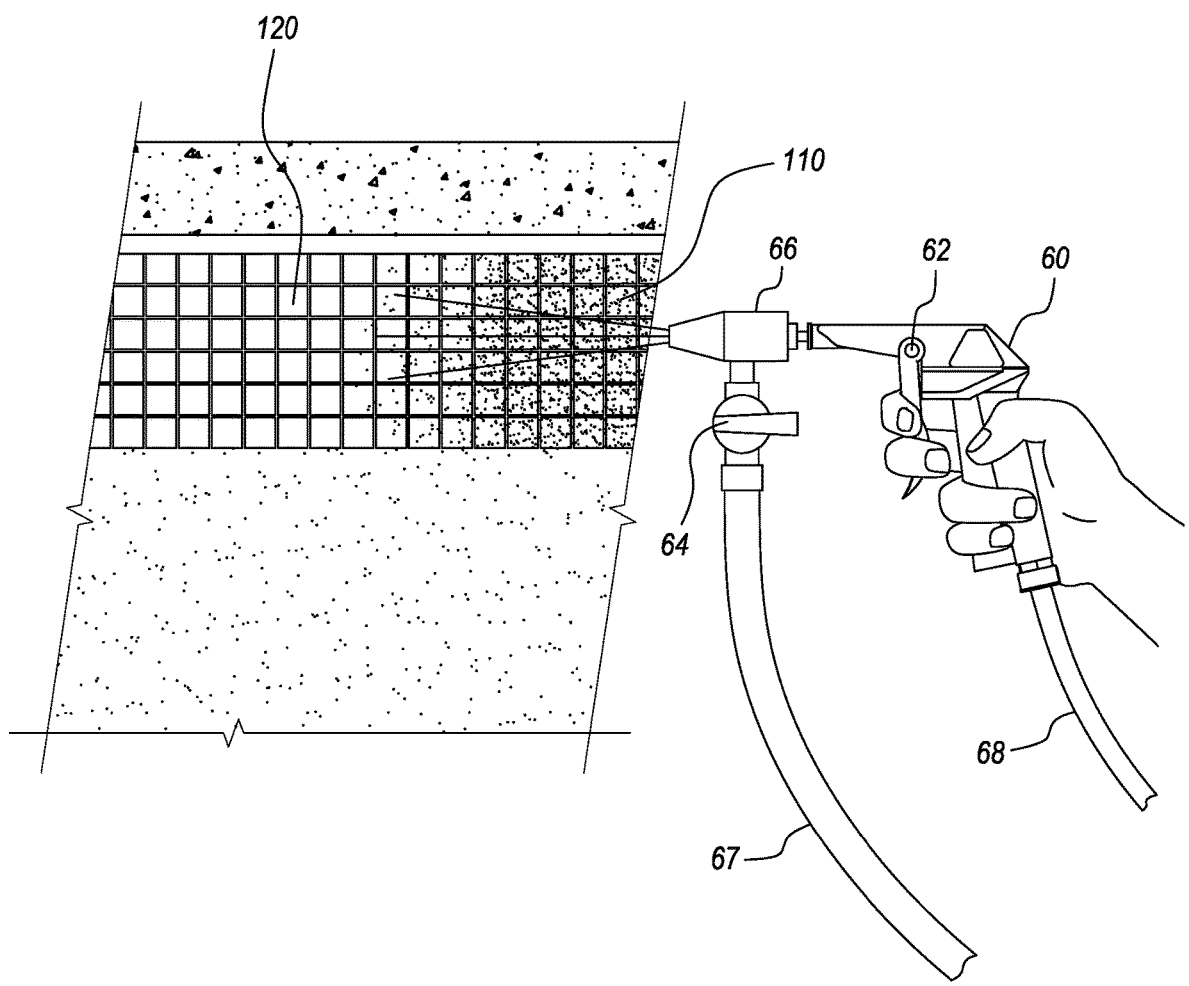
FIG. 3 is an enlarged view of blasting gun with attached components and environmental subject matter.
Figure 4:
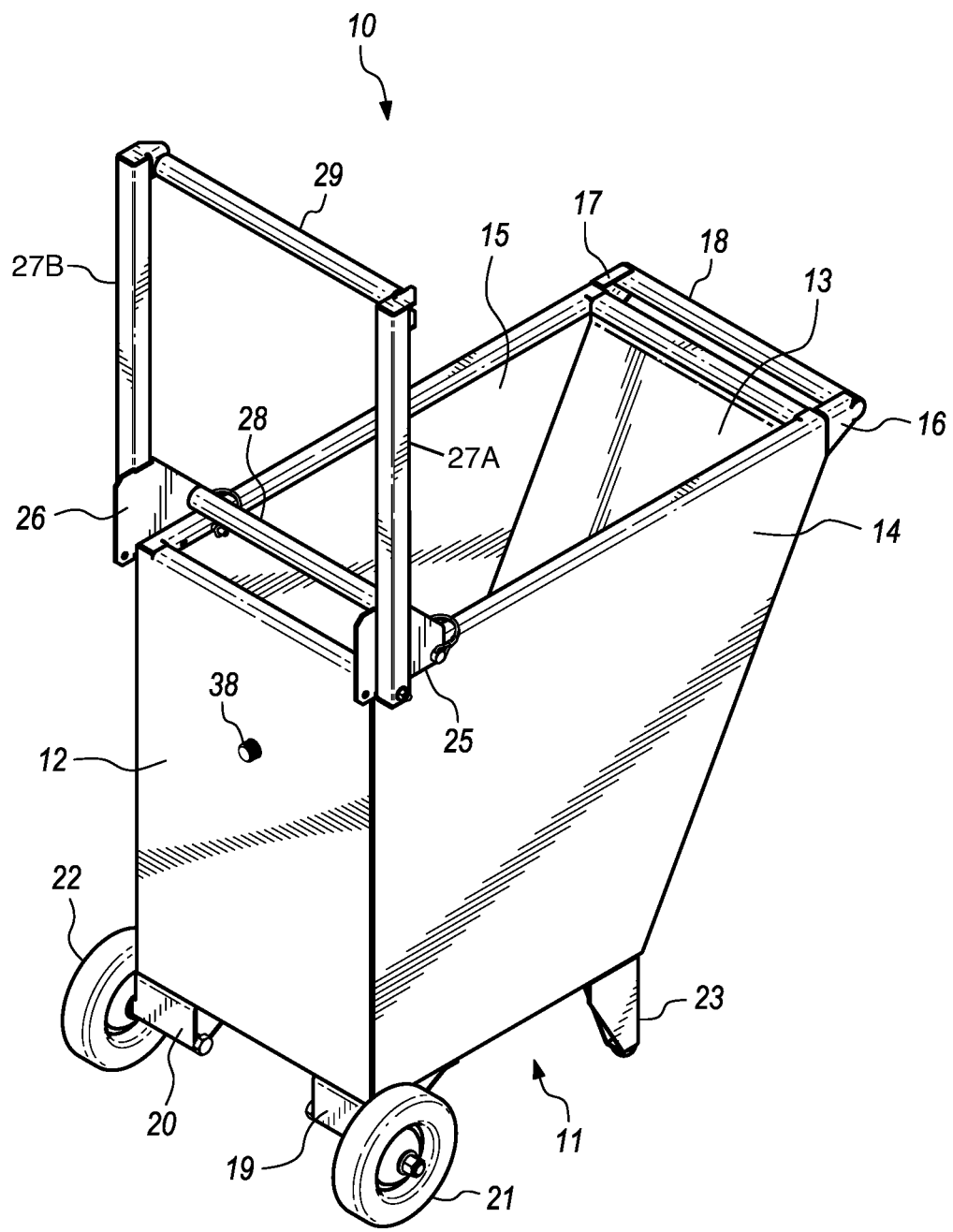
FIG. 4 is a perspective view of hand truck tank with stowable hose rack raised.
Figure 5:
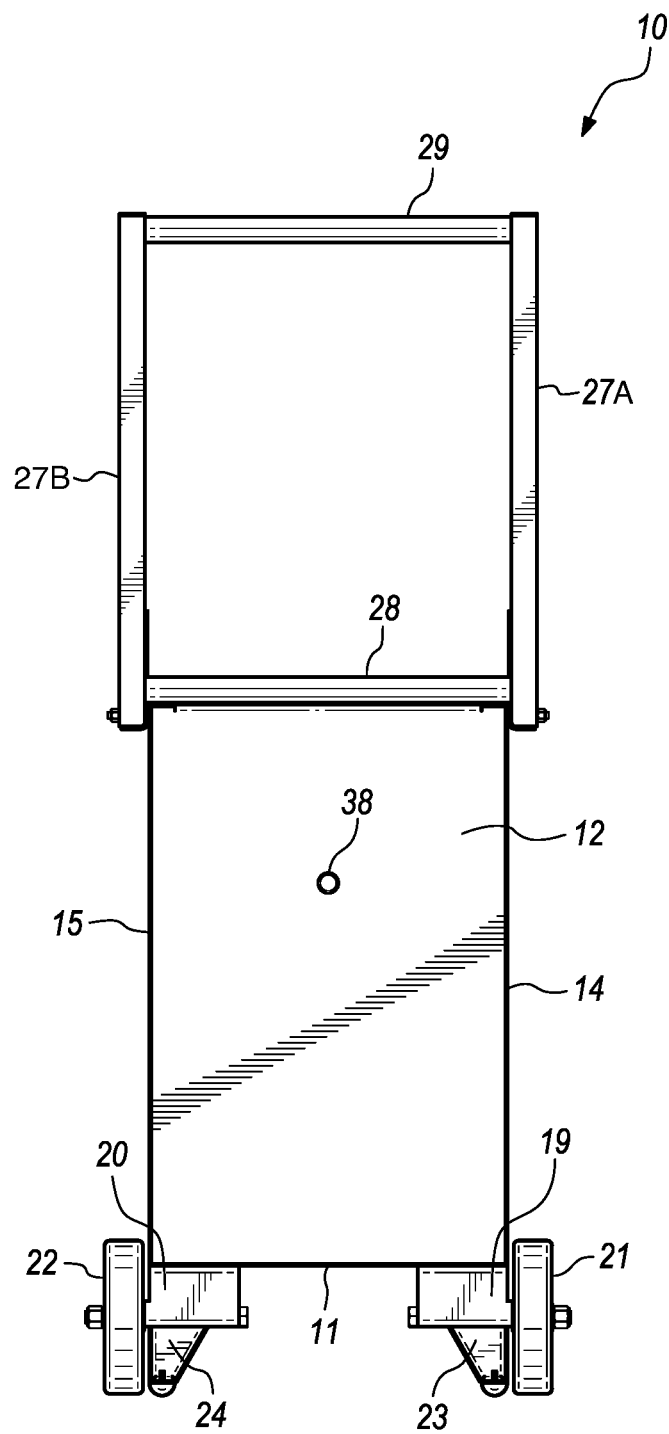
FIG. 5 is a front elevation view of hand truck tank with stowable hose rack raised.
Figure 6:
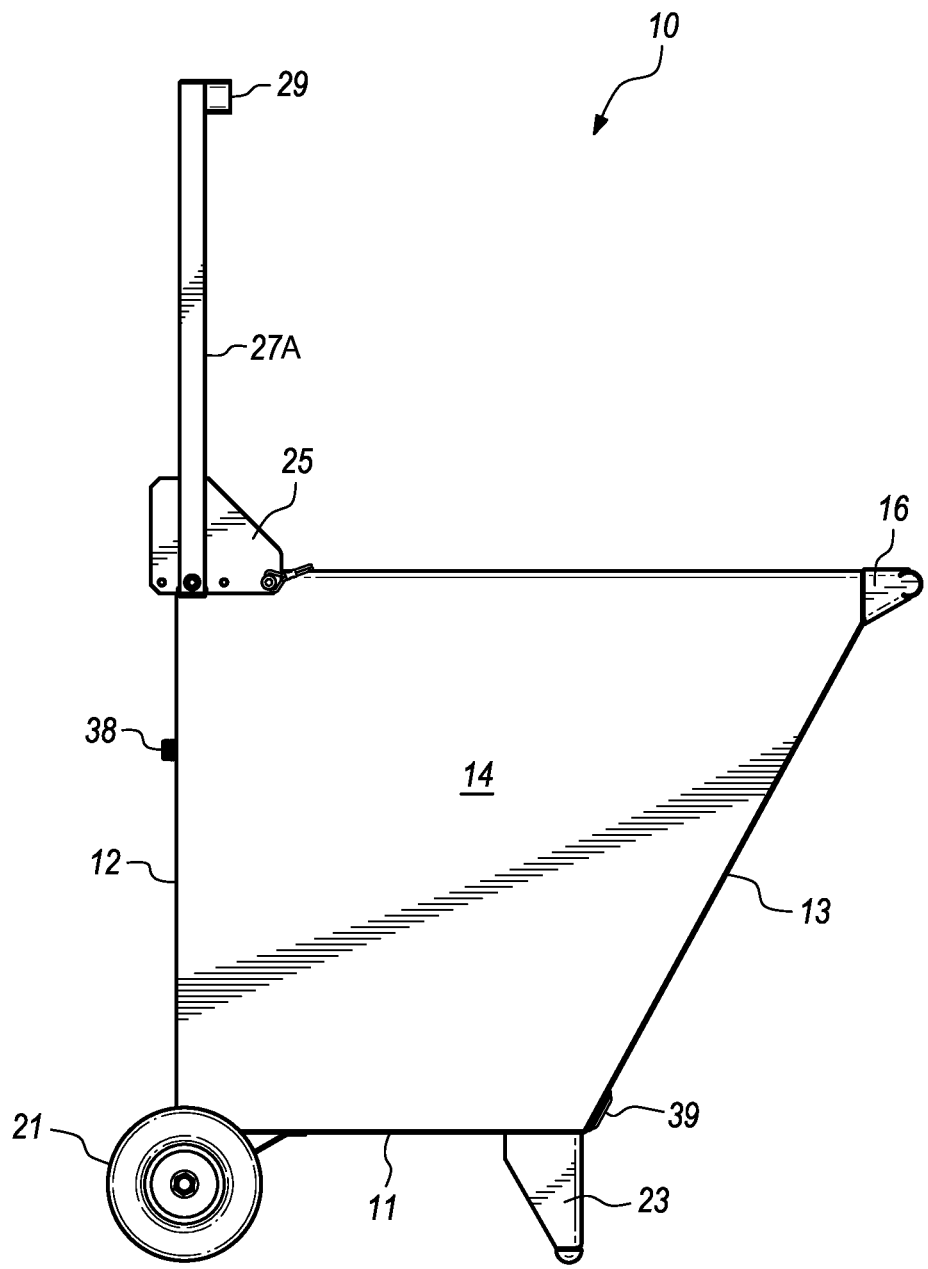
FIG. 6 is a right side elevation view of hand truck tank with stowable hose rack raised, the left side elevation view being a mirror image thereof.
Figure 7:
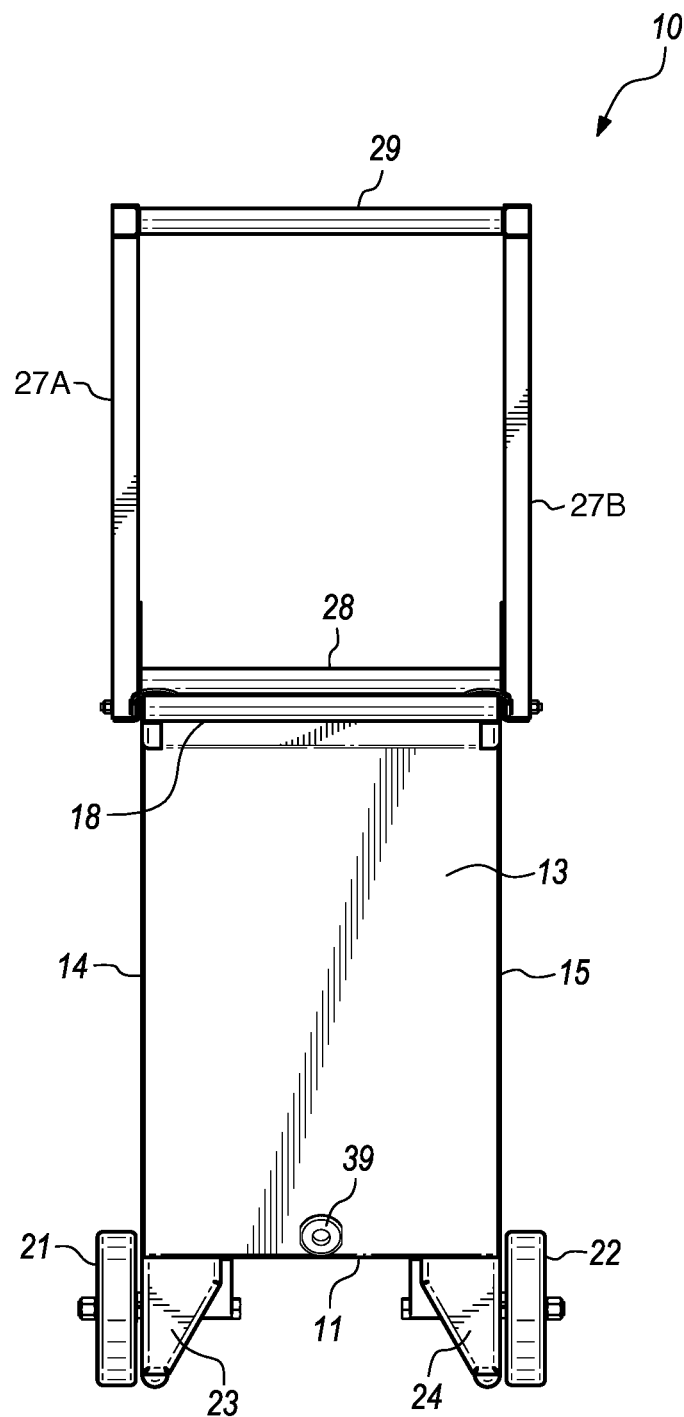
FIG. 7 is a rear elevation view of hand truck tank with stowable hose rack raised.
Figure 8:
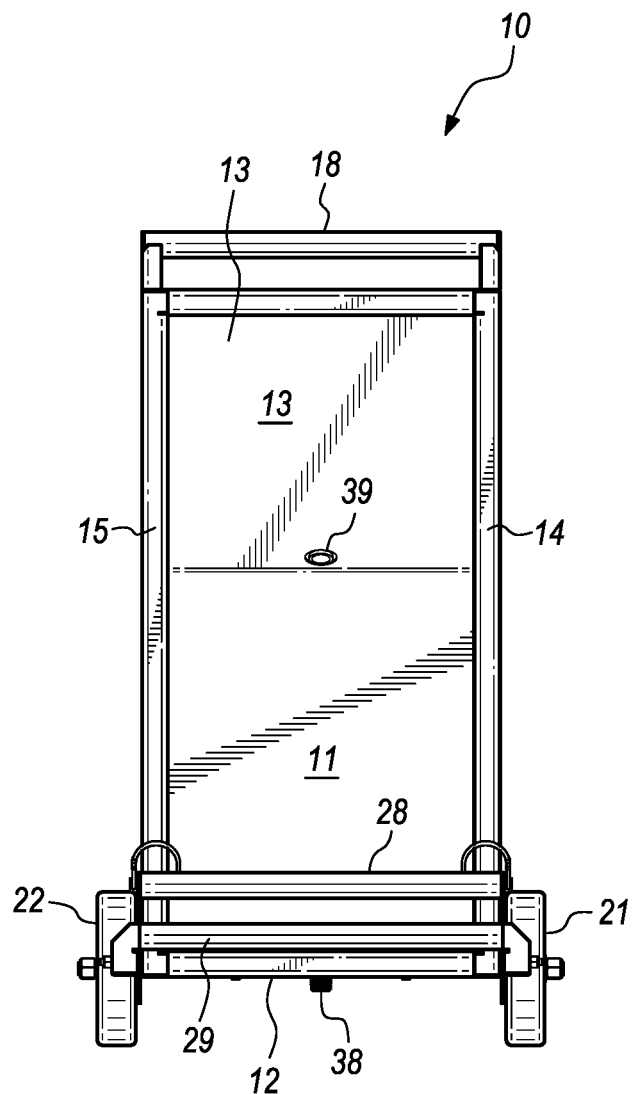
FIG. 8 is a top plan view of hand truck tank with stowable hose rack raised.
Figure 9:
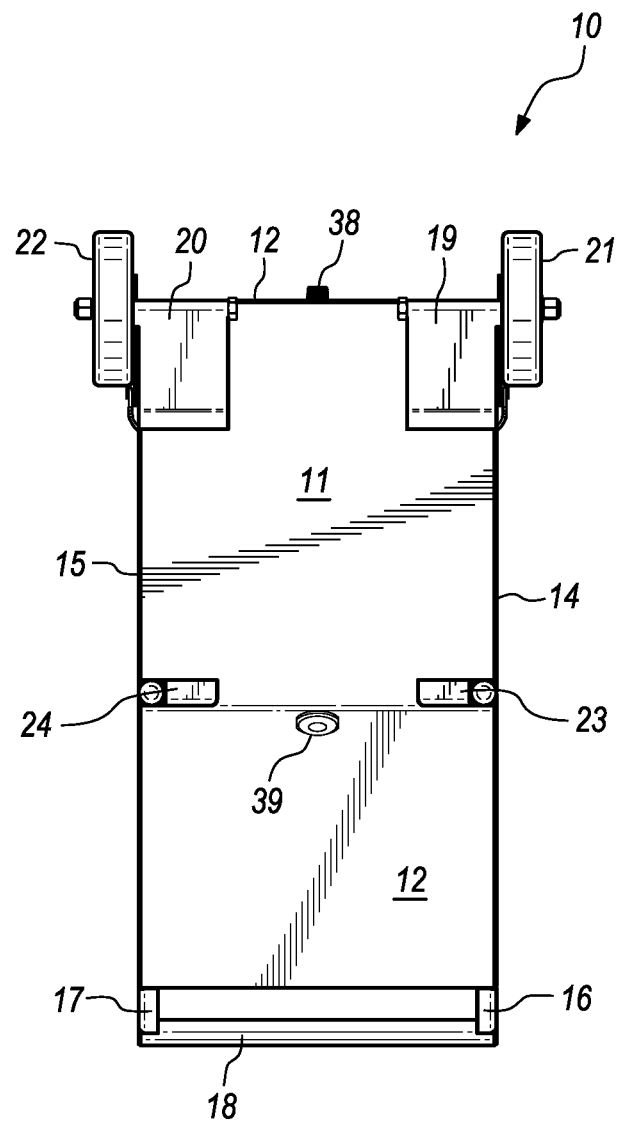
FIG. 9 is a bottom plan view of hand truck tank with stowable hose rack raised.
Figure 10:
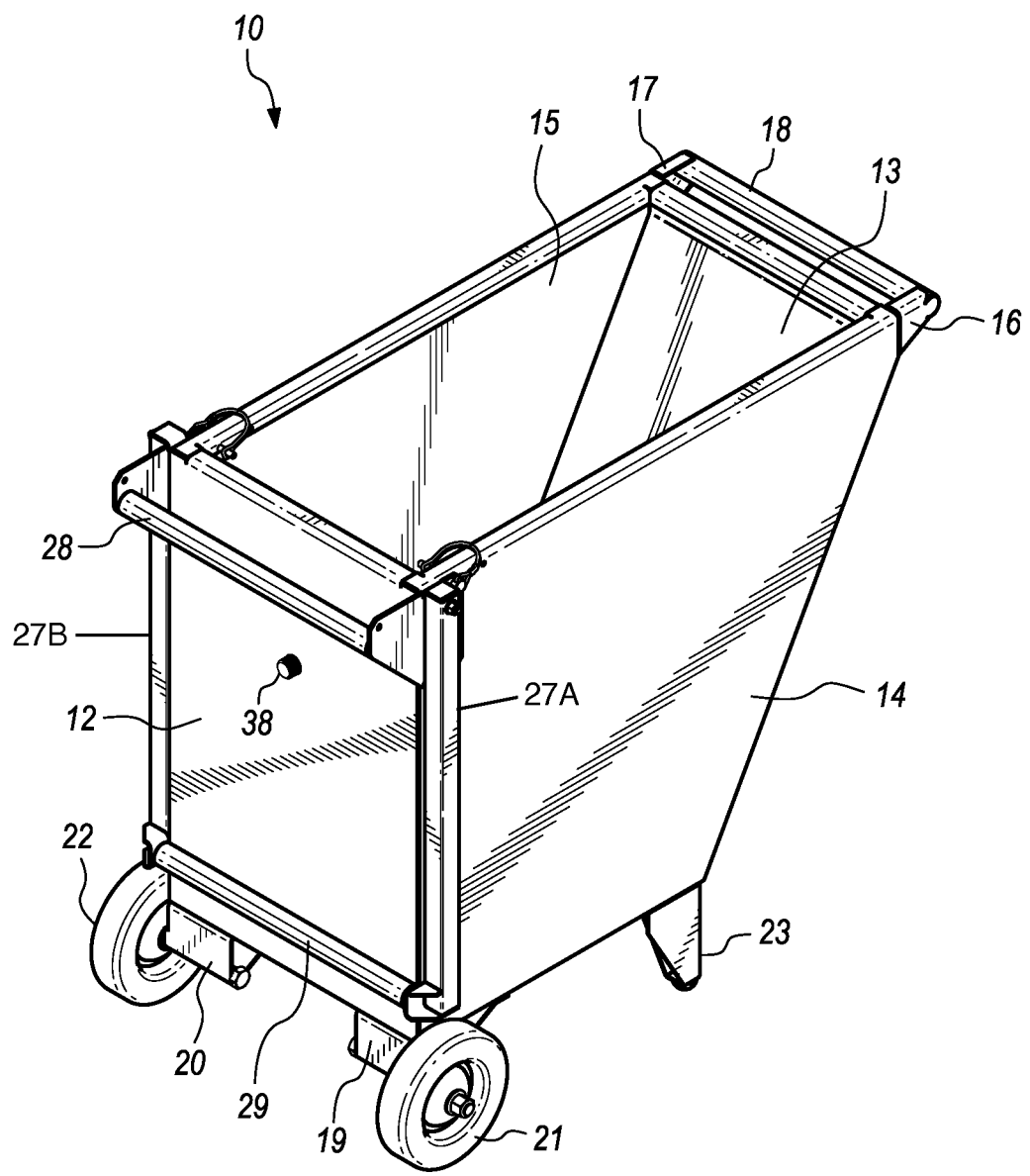
FIG. 10 is a perspective view of hand truck tank with stowable hose rack lowered.
Figure 11:
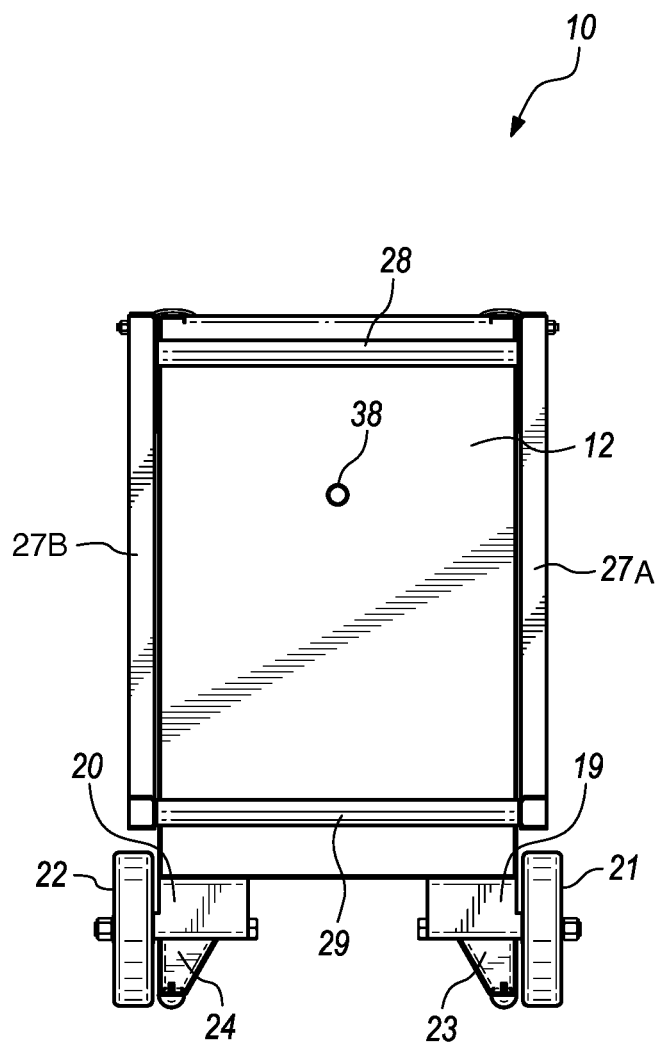
FIG. 11 is a front elevation view of hand truck tank with stowable hose rack lowered.
Figure 12:
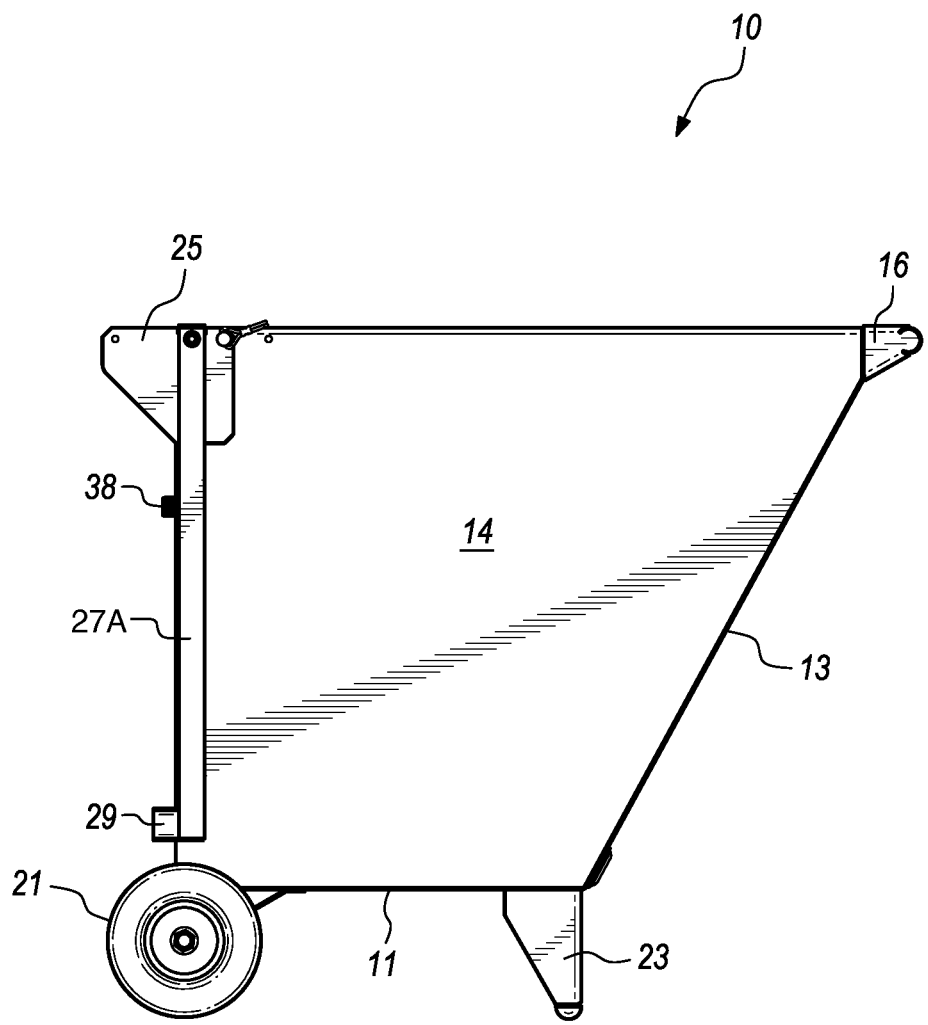
FIG. 12 is a right side elevation view of hand truck tank with stowable hose rack lowered, the left side elevation view being a mirror image thereof.
Figure 13:
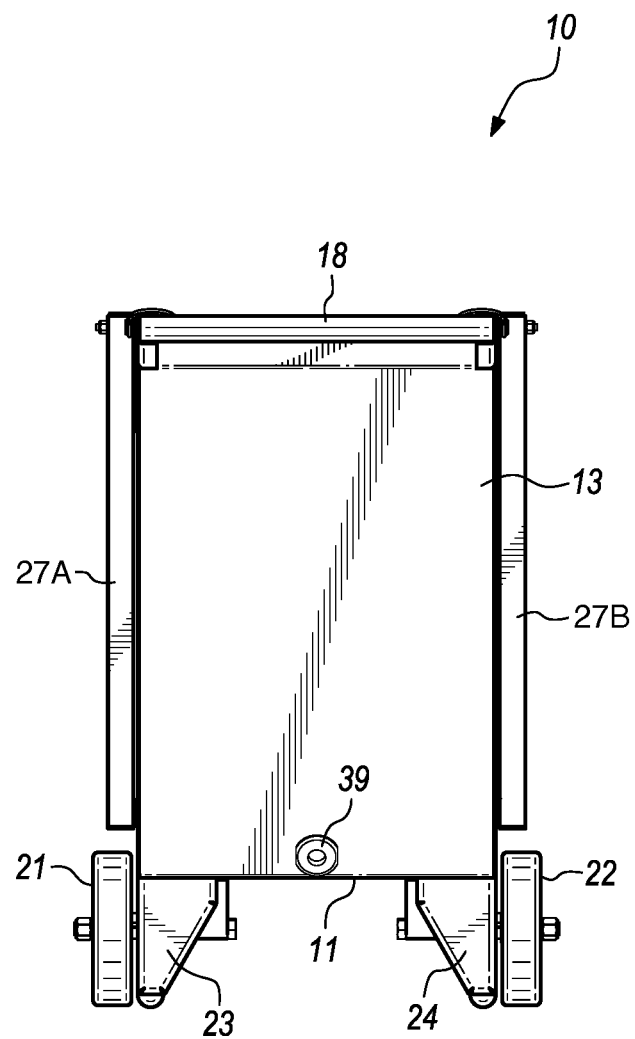
FIG. 13 is a rear elevation view of hand truck tank with stowable hose rack lowered.
Figure 14:
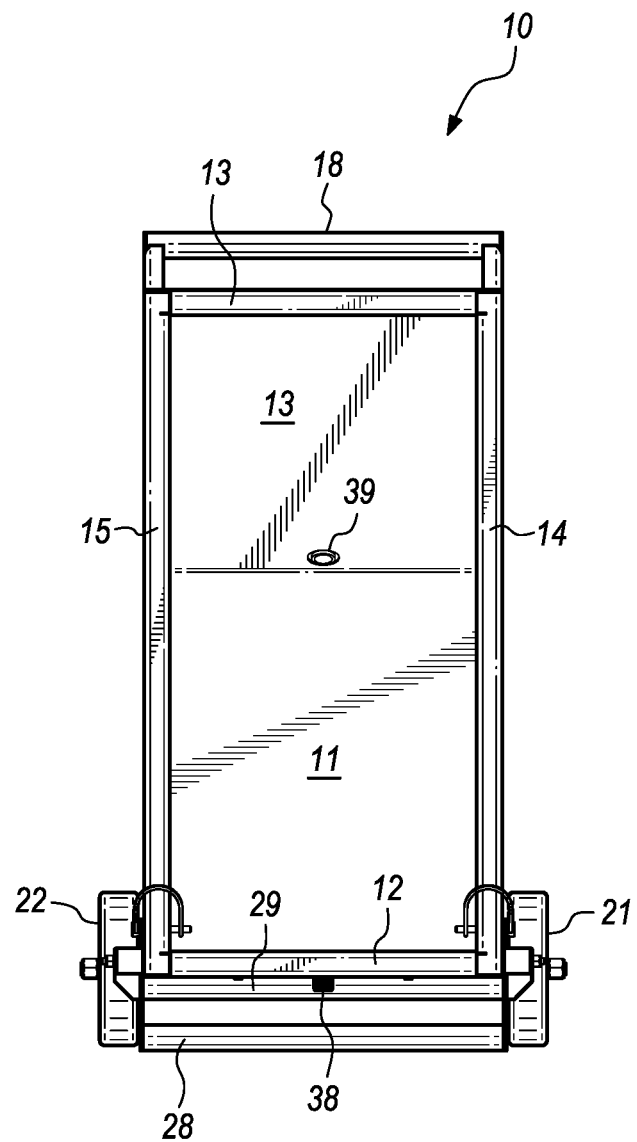
FIG. 14 is a top plan view of hand truck tank with stowable hose rack lowered.
Figure 15:
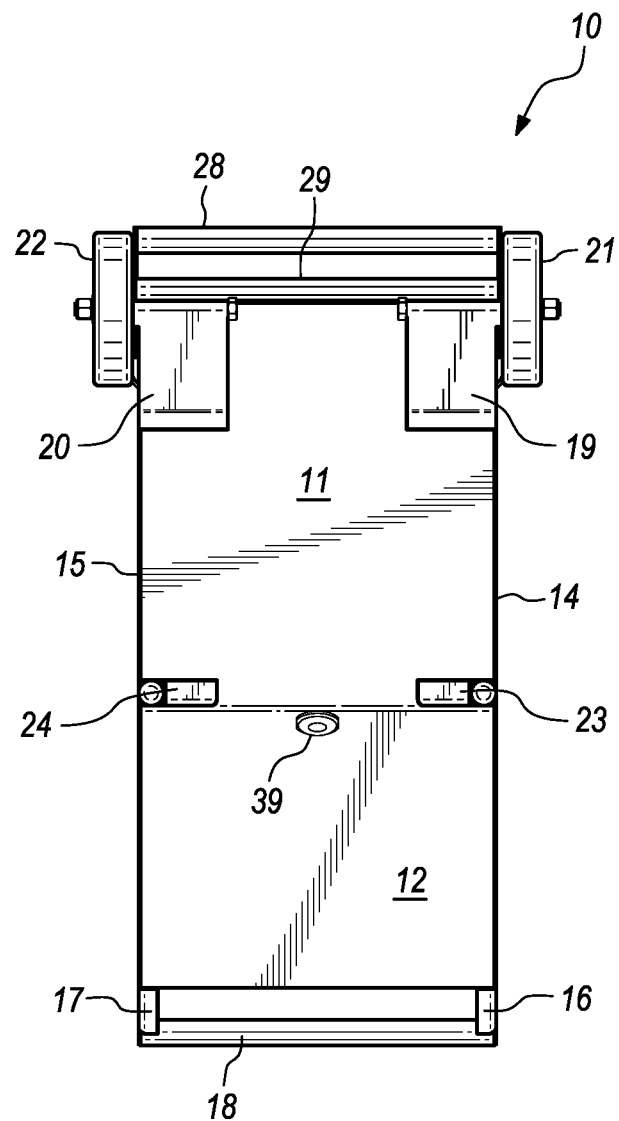
FIG. 15 is a bottom plan view of hand truck tank with stowable hose rack lowered.

In order to properly use portable wet sand blaster 5 all the above mentioned connections and attachments are completed. Then hand truck tank 10 is filled with water and the required amount of abrasive solid material. Any known type of abrasive solid material may be used. Next the slurry pump 30 is turned on to start mixing the slurry 100. The slurry pump 30 also pressurizes the slurry output line 49 and the slurry feed line 67 so slurry valve 64 must be in the off position until the user is ready to start wet sanding blasting. The air compressor 50 is then turned on and the pressure regulator 54 is set to the desired air pressure. Air pressure could be set anywhere from 20-200 pounds per square inch. The air compressor 50 pressurizes the compressed air feed line 68 so air valve 62 on blasting gun 60 must be in the off position until the user is ready to start wet sanding blasting. In order to start wet sand blasting, the blasting gun 60 and nozzle 66 are aimed or pointed at a workpiece 110 with some sort of unwanted surface coating like paint, calcium build up, grease or oil build up, vegetative growth, barnacles, moss, etc. Then the slurry valve 64 is opened and the air valve 62 is depressed or opened in order to start the flow of compressed air and slurry mix 100 out from the blasting gun 60 and nozzle 66 as depicted in FIG. 3. The flow of compressed air and slurry mix 100 then washes or otherwise removes the unwanted surface coating in order to leave a workpiece that is stripped of the unwanted surface coating 120 as depicted in FIG. 3.

During operation of portable wet sand blaster 5, the main output on nozzle 66 is pointed towards a workpiece 110, and a combination of compressed air and slurry mix 100 is sprayed, ejected, or squirted onto the surface of a workpiece as depicted in FIG. 3. The compressed air or high pressure air from blasting gun 60 enters into the main input of nozzle 66, travels through the constricted area of nozzle 66, and then travels out through the main output of nozzle 66. During this process, through Venturi action, this compressed air flow sucks or pulls slurry mix 100 in through the secondary input of nozzle 66, which is located at the constricted point, as with all venturi tubes or pumps.

The blasting gun 60 and nozzle 66 described above is very typical and standard in the use of all sand blasting devices.

Any known type of blasting gun 60 and nozzle 66 may be used with portable wet sand blaster 5.

What is claimed is:

1. A portable wet sand blaster comprising: a hand truck tank; a slurry pump; a manifold; and a blasting gun, wherein,
said hand truck tank comprises: a bottom panel; a front side; a rear side; a right side; and a left side, wherein,
said bottom panel is a rigid rectangular horizontal planar member with a front edge, a rear edge, a left edge, a right edge, an inner surface, and an outer surface,
said front side is a rigid rectangular vertical planar member with an upper edge, a lower edge, a left edge, a right edge, an inner surface, and an outer surface,
said front side has a slurry feed line hole or fitting therein which is a circular hole, fitting, connector, or flange in said front side that is used to pass a slurry feed line therethrough,
said rear side is a rigid rectangular planar angled member with an upper edge, a lower edge, a left edge, a right edge, an inner surface, and an outer surface,
said rear side has a drain hole therein which is a circular hole in said rear side that is used to attach a drain valve thereto,
said right side is a rigid right trapezoid vertical planar member with an upper edge, a lower edge, a front edge, a rear edge, an inner surface, and an outer surface,
said upper and lower edges of said right side are parallel with each other and perpendicular to said front edge of said right side,
said left side is a rigid right trapezoid vertical planar member with an upper edge, a lower edge, a front edge, a rear edge, an inner surface, and an outer surface,
said upper and lower edges of said left side are parallel with each other and perpendicular to said front edge of said left side,
said lower edge of said front side is connected to and contiguous with said front edge of said bottom panel to form a rigid watertight connection therebetween,
said front side is positioned perpendicular to said bottom panel,
said right edge of said front side is connected to and contiguous with said front edge of said right side to form a rigid watertight connection therebetween,
said front side is positioned perpendicular to said right side,
said left edge of said front side is connected to and contiguous with said front edge of said left side to form a rigid watertight connection therebetween,
said front side is positioned perpendicular to said left side,
said lower edge of said right side is connected to and contiguous with said right edge of said bottom panel to form a rigid watertight connection therebetween,
said rear edge of said right side is connected to and contiguous with said left edge of said rear side to form a rigid watertight connection therebetween,
said lower edge of said left side is connected to and contiguous with said left edge of said bottom panel to form a rigid watertight connection therebetween,
said rear edge of said left side is connected to and contiguous with said right edge of said rear side to form a rigid watertight connection therebetween,
said lower edge of said rear side is connected to and contiguous with said rear edge of said bottom panel to form a rigid watertight connection therebetween,
said rear side is positioned at an obtuse angle with said bottom panel,
said rear side is positioned at a right angle with said right and left sides,
said upper edges of said front side, said right side, said left side, and said rear side are horizontal and aligned with each other to form a flat top or opening of said hand truck tank,
said slurry pump is a pump or a device,
said slurry pump is a submersible pump or sub pump,
said slurry pump has an intake port or opening and an output port or opening,
said manifold comprises: a manifold input; a middle section; a main manifold output; a Y-branch output; a T-fitting; a first length of pipe or conduit; a second length of pipe or conduit; a first elbow fitting; a second elbow fitting; a first slurry mixing output; a second slurry mixing output; and a slurry output line,
said manifold input is a length of cylindrical conduit, flow channel, pipe, hose, tubing, or duct with a first end, a second end, a longitudinal axis, an inner diameter, and an outer diameter,
said manifold input is reversibly attachable to said output port or opening on said slurry pump using a fitting, connector, flange, or other interface to make a watertight connection therebetween,
said main manifold output is a length of cylindrical conduit, flow channel, pipe, hose, tubing, or duct with a first end, a second end, a longitudinal axis, an inner diameter, and an outer diameter,
said first end of said main manifold output is rigidly attached to said second end of said manifold input to make a watertight connection therebetween,
said longitudinal axis of said manifold input is parallel with said longitudinal axis of said main manifold output,
said Y-branch output is a is a length of cylindrical conduit, flow channel, pipe, hose, tubing, or duct with a first end, a second end, a longitudinal axis, an inner diameter, and an outer diameter,
said first end of said Y-branch output is rigidly attached to said middle section of said manifold in between said manifold input and said main manifold output to make a watertight connection therebetween,
said longitudinal axis of said Y-branch output is at an acute angle to said longitudinal axis of said main manifold output,
said longitudinal axis of said Y-branch output is at an obtuse angle to said longitudinal axis of said manifold input,
said T-fitting is a T-shaped fitting or section of cylindrical conduit, flow channel, pipe, hose, tubing, or duct with a base end, a first end, a second end, an inner diameter, and an outer diameter,
said base end is the bottom end or base end of said T-shape,
said first end and said second end are the upper ends of said T-shape,
said first length of pipe or conduit is a horizontal length of cylindrical conduit, flow channel, pipe, hose, tubing, or duct with a first end and a second end with a first end, a second end, a length, an inner diameter, and an outer diameter, said second length of pipe or conduit is a horizontal length of cylindrical conduit, flow channel, pipe, hose, tubing, or duct with a first end and a second end with a first end, a second end, a length, an inner diameter, and an outer diameter, said first elbow fitting is a L-shaped fitting or section of cylindrical conduit, flow channel, pipe, hose, tubing, or duct with a base end, a first end, a second end, an inner diameter, and an outer diameter, said second elbow fitting is a L-shaped fitting or section of cylindrical conduit, flow channel, pipe, hose, tubing, or duct with a base end, a first end, a second end, an inner diameter, and an outer diameter, said first slurry mixing output is a length of cylindrical conduit, flow channel, pipe, hose, tubing, or duct with a first end, a second end, a length, a longitudinal axis, an inner diameter, and an outer diameter, said longitudinal axis of said first slurry mixing output is essentially parallel with the plane of said rear side of said hand truck tank, said second slurry mixing output is a length of cylindrical conduit, flow channel, pipe, hose, tubing, or duct with a first end, a second end, a length, a longitudinal axis, an inner diameter, and an outer diameter, said longitudinal axis of said second slurry mixing output is essentially parallel with the plane of said rear side of said hand truck tank, said slurry output line is a length of cylindrical conduit, flow channel, pipe, hose, tubing, or duct with a first end, a second end, a length, an inner diameter, and an outer diameter, said base end of T-fitting is rigidly attached to said main manifold output to make a watertight connection therebetween, said first end of said T-fitting is rigidly attached to said first end of said first length of pipe or conduit, said second end of said T-fitting is rigidly attached to said first end of said second length of pipe or conduit, said second end of said first length of pipe or conduit is rigidly attached to said first end of said first elbow fitting, said second end of said second length of pipe or conduit is rigidly attached to said first end of said second elbow fitting, said second end of said first elbow fitting is rigidly attached to said first end of said first slurry mixing output, said second end of said second elbow fitting is rigidly attached to said first end of said second slurry mixing output, said second end of said first slurry mixing output is open, said second end of said second slurry mixing output is open, said first end of said slurry output line is rigidly attached to said second end of said Y-branch output to make a watertight connection therebetween, said second end of said slurry output line is rigidly attached to said slurry feed line hole or fitting in said front side of said hand truck tank, said blasting gun is a is an apparatus that sprays, ejects, or squirts compressed air and a slurry mix onto a surface of a workpiece, said blasting gun comprises: a first end, a second end, an air valve, a slurry valve; a nozzle; a slurry feed line; and a compressed air feed line, said nozzle is a venturi tube with a main input, a constricted area, a secondary input, and a main output, said air valve is a valve that controls, adjusts, and shuts off air flow through said blasting gun, said air valve is located on said blasting gun, said slurry valve is a valve that controls, adjusts, and shuts off the flow of said slurry mix through said secondary input of said nozzle, said slurry valve has a first end and a second end, said compressed air feed line is a length of cylindrical conduit, flow channel, pipe, hose, tubing, or duct with a first end, a second end, a length, an inner diameter, and an outer diameter, said slurry feed line is a length of cylindrical conduit, flow channel, pipe, hose, tubing, or duct with a first end, a second end, a length, an inner diameter, and an outer diameter, said main input of said nozzle is connected to said second end of said blasting gun, said main input on said nozzle is attached to said second end said blasting gun, said second end of said slurry valve is attached to said secondary input on said nozzle, said first end of said slurry valve is connected to said second end of said slurry feed line, said first end of said slurry feed line is connected to said slurry feed line hole or fitting on aid front side of said hand truck tank, said first end of said compressed air feed line is indirectly connected to an air compressor, and second end of said compressed air feed line is connected to said first end of said blasting gun.

2. A portable wet sand blaster as recited in claim 1 further comprising:

a first handle support; a second handle support; a handle; a first wheel support; a second wheel support; a first wheel; a second wheel; a first base foot; and a second base foot, wherein, said handle is a rigid oblong member with a first end and a second end, said first handle support is a rigid base member or support member that is rigidly attached to said outer surface of said rear side of said hand truck tank, adjacent to said right side of said hand truck tank, said second handle support is a rigid base member or support member that is rigidly attached to said outer surface of rear side of said hand truck tank, adjacent to said left side of said hand truck tank, said first end of said handle is rigidly attached to said first handle support, said second end of said handle is rigidly attached to said second handle support, said first wheel is a wheel or a rigid disk shaped member with a center hole and a circumference, an axle is attached to said center hole of said first wheel, said second wheel is a wheel or a rigid disk shaped member with a center hole and a circumference, said axle is attached to said center hole of said second wheel, said first wheel support is a rigid base member or support member that is rigidly attached to said outer surface of said bottom panel of said hand truck tank, adjacent to said front side and said right side of said hand truck tank, said second wheel support is a rigid base member or support member that is rigidly attached to said outer surface of said bottom panel of said hand truck tank, adjacent to said front side and said left side of said hand truck tank, said axle is attached to said first wheel support, said axle is attached to said second wheel support, said first foot base is a rigid base member or support member that is rigidly attached to said outer surface of said bottom panel of said hand truck tank, adjacent to said rear side and said right side of said hand truck tank, and said second foot base is a rigid base member or support member that is rigidly attached to said outer surface of said bottom panel of said hand truck tank, adjacent to said rear side and said left side of said hand truck tank.

3. A portable wet sand blaster as recited in claim 1 further comprising:

a first stowable hose rack mounting bracket; a second stowable hose rack mounting bracket; a first stanchion; a second stanchion; a first cross member; and a second cross member, wherein, said first stowable hose rack mounting bracket is a rigid planar member with an upper edge, a lower edge, a front edge, a rear edge, a right surface, and a left surface, a pivot pin hole, and a lock pin hole, said second stowable hose rack mounting bracket is a rigid planar member with an upper edge, a lower edge, a front edge, a rear edge, a right surface, and a left surface, a pivot pin hole, and a lock pin hole, said first stanchion is a rigid oblong member with a first end, a second end, a front surface, a rear surface, a right surface, a left surface, and a longitudinal axis, said second stanchion is a rigid oblong member with a first end, a second end, a front surface, a rear surface, a right surface, a left surface, and a longitudinal axis, said first cross member is a rigid oblong member with a right end, a left end, a front surface, a rear surface, a top surface, a bottom surface, and a longitudinal axis, said second cross member is a rigid oblong member with a right end, a left end, a front surface, a rear surface, a top surface, a bottom surface, and a longitudinal axis, said first end of said left surface of said first stanchion is rigidly attached to said right surface of said first stowable hose rack mounting bracket, said first end of said right surface of said second stanchion is rigidly attached to said left surface of said second stowable hose rack mounting bracket, said right end of said first cross member is rigidly attached to said left surface of said first stowable hose rack mounting bracket, said left end of said first cross member is rigidly attached to said right surface of said second stowable hose rack mounting bracket, said right end of said second cross member is rigidly attached to said front surface of said first stanchion, said left end of said second cross member is rigidly attached to said front surface of said second stanchion, said inside surface of said first stowable hose rack mounting bracket is pivotally attached to said outer surface of said right side of said hand truck tank, and said inside surface of said second stowable hose rack mounting bracket is pivotally attached to said outer surface of said left side of said hand truck tank.

4. A portable wet sand blaster as recited in claim 1 further comprising:

an air compressor, an air compressor output hose, and a pressure regulator, wherein, said air compressor is an air compressor or a pneumatic device that converts power from an electric motor, diesel or gasoline engine into potential energy stored in pressurized air or compressed air, said air compressor output hose is a length of cylindrical conduit, flow channel, pipe, hose, tubing, or duct with a first end, a second end, a length, an inner diameter, and an outer diameter, said pressure regulator is a special valve that controls the pressure of air or gas to a desired value with an input connector and an output connector, said first end of said air compressor output hose is connected to said air compressor, said second end of said air compressor output hose is connected to said input connector on said pressure regulator, and said first end of said compressed air feed line is connected to said output connector on said pressure regulator.

\* \* \* \* \*